United States Patent [19]

Michaloski

[11] Patent Number: 5,040,329
[45] Date of Patent: Aug. 20, 1991

[54] METHOD AND APPARATUS FOR ULTRAVIOLET TREATMENT OF PLANTS

[76] Inventor: Alfred J. Michaloski, 5390 Grape Rd., P.O. Box 26, Lakemont, N.Y. 14857

[21] Appl. No.: 456,467

[22] Filed: Dec. 26, 1989

[51] Int. Cl.⁵ .................. H05B 41/16; B05B 5/00
[52] U.S. Cl. .................................. 47/65; 47/1.01; 47/DIG. 6
[58] Field of Search .... 47/DIG. 6, DIG. 8, DIG. 12, 47/65, 1.01, 2, 1.7, 58

[56] References Cited

U.S. PATENT DOCUMENTS

| | | | |
|---|---|---|---|
| Re. 31,023 | 9/1982 | Hall, III | 47/DIG. 6 |
| 4,749,916 | 6/1988 | Yamazaki et al. | 47/DIG. 6 |
| 4,835,442 | 5/1989 | Sugimoto et al. | 313/565 |
| 4,893,755 | 1/1990 | Keothley | 47/1.7 |

Primary Examiner—Richard E. Chilcot, Jr.
Assistant Examiner—Michael A. Van Patten

[57] ABSTRACT

Ultraviolet energy in the germicidal band is directed towards plants, particularly the grape vines on the vineyard trellis, providing a lethal exposure (irradiation) for the purpose of eradicating microorganisms, and stimulating host plant defense mechamisms.

12 Claims, 7 Drawing Sheets

METHOD AND APPARATUS FOR ULTRAVIOLET TREATMENT OF PLANTS

BACKGROUND OF THE INVENTION

1. Field of the invention

This invention relates generally to the field of crop agriculture and more particularly to means for providing eradication of harmful viticulture microorganisms.

2. Description of Prior Art

The established viticultural practice for eliminating vineyard microorganisms in its most prevalent form as a fungus and its means of reproduction by spores has been to apply liberal doses of fungicides by broad coverage spraying techniques using spray applicators.

The infection of green tissue, flower clusters and buds by spores results in fungal diseases common to the grape family and most agricultural crops. When spore infection occurs conidia are produced and the disease spreads rapidly throughout the vineyard. The spread of disease is enhanced if the combination of temperature, leaf wetness and time are satisfied. Some of the fungal diseases that attack grapes in particular are: (1) Powdery Mildew, (2) Downey Mildew, (3) Black Rot, (4) Phomopsis Cane and Leaf Spot, (5) Eutypa Dieback.

The sprayers are drawn through the vineyard rows with tractors which may also supply the power to drive the spray pumps. Various spray fungicides are applied at periodic intervals. Generally these intervals are 10 to 14 days but may become shorter resulting in more frequent applications during rainy or high humidity seasons.

The use of pesticides has become frought with problems for the grape grower due to their chemical nature, the necessary safety precautions required, government regulations and the consumers reluctance to eat produce treated with pesticides. The spray operator, for his own safety, is required to wear protective clothing, a special breathing mask, eye goggles and water proof gloves to prevent contamination by toxic pesticides. Present fungicides work in the following manner:

a. The fungicide is absorbed within the plant tissue (the fungicide is systemic) or provides a protective coating on the surface.

b. It acts as an protectant to prevent infection, or if the plant is already infected it acts as an eradicant to stop infection or as an antisporulant to prevent disease spread.

Turning now to a brief consideration of a specific disclosure of interest, U.S. Pat. No. 1,876,737 issued to F. W. Opp on Sept. 13, 1932 discloses an apparatus for the ray treatment of vegetation. This patent was directed primarily to destroying parasitic life specifically with high voltage electrical rays (X-Rays) for the treatment of trees. It is also known to use infra red or colored lights in the visible spectrum for the purpose of stimulating or controlling growth of plants, their seeds or increasing fruit set, as disclosed for example in U.S. Pat. Nos. 2,300,727, 3,372,513, 3,931,695, 4,041,642, and 4,506,474. None of the above mentioned references relate to the treatment of plants or vineyards with apparatus using Ultraviolet energy in the germicidal band for its proven fungicidal action.

SUMMARY OF THE INVENTION

A principle object of the present invention is to provide environmentally safe means for eradicating harmful viticultural microorganisms that cause, in particular, fungal diseases both by the direct effect of UV energy in the germicidal band upon pathogenic microbes, and by the indirect suppression of pathogens by stimulation of phytoalexin synthesis.

It is another object of the invention to provide such a means suitable for use in vineyards and fields using a tractor or other driving devices.

The present invention provides apparatus for irradiating the vineyard with an Ultraviolet exposing source operating in the germicidal band. In accordance with a preferred embodiment, the apparatus includes an array of lamps and energy directing reflectors that provide an appropriate level of irradiance and sufficient area coverage along with time exposure to provide the lethal dosage required to destroy fungal spores. The present invention further provides apparatus to agitate or move the leaves so that the Ultraviolet rays impinge on both sides of the leaves and fruit.

DESCRIPTION OF THE ILLUSTRATIVE PREFERRED EMBODIMENT

Figure 1:
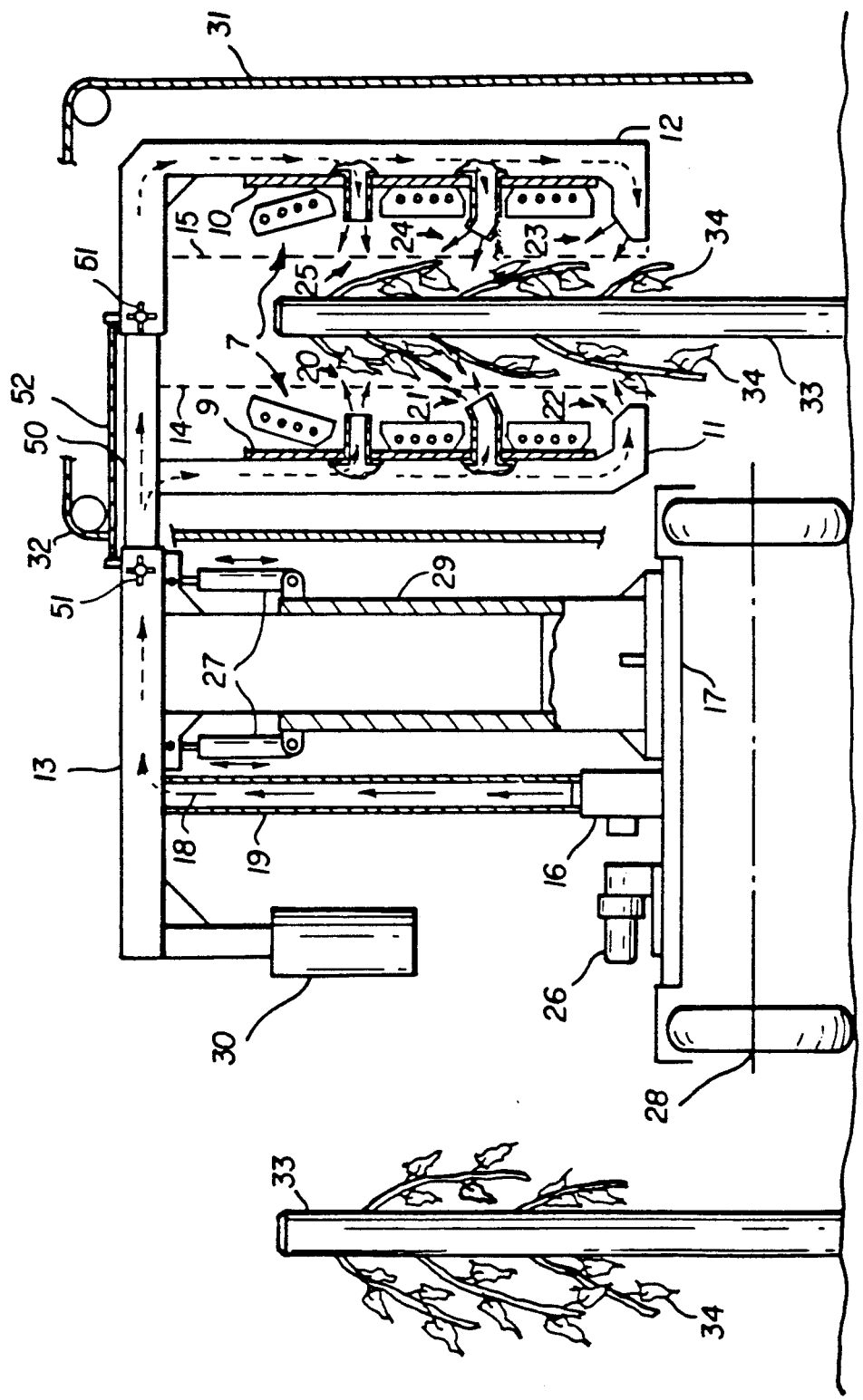
FIG. 1. is a front view of an illustrative preferred embodiment of the invention of a complete one row exposing apparatus as it would appear from the towing vehicle.

As depicted in FIG. 1 an array of left UV lamp/reflector assemblies 9 (of FIG. 4) are mounted on left support frame 11. Similarly an array of right UV lamp/reflector assemblies 10 are mounted on right support frame 12. Support frames 11 and 12 are in turn mounted to upper structural frame 13. Protective screen 14 is placed between the bank of left lamp/reflector assemblies 9 and the grape vines 34 as well as protective screen 15 between the right array of lamp/reflector assemblies 10 and the grape vines 34 on the opposite side of the trellis.

Figure 4:
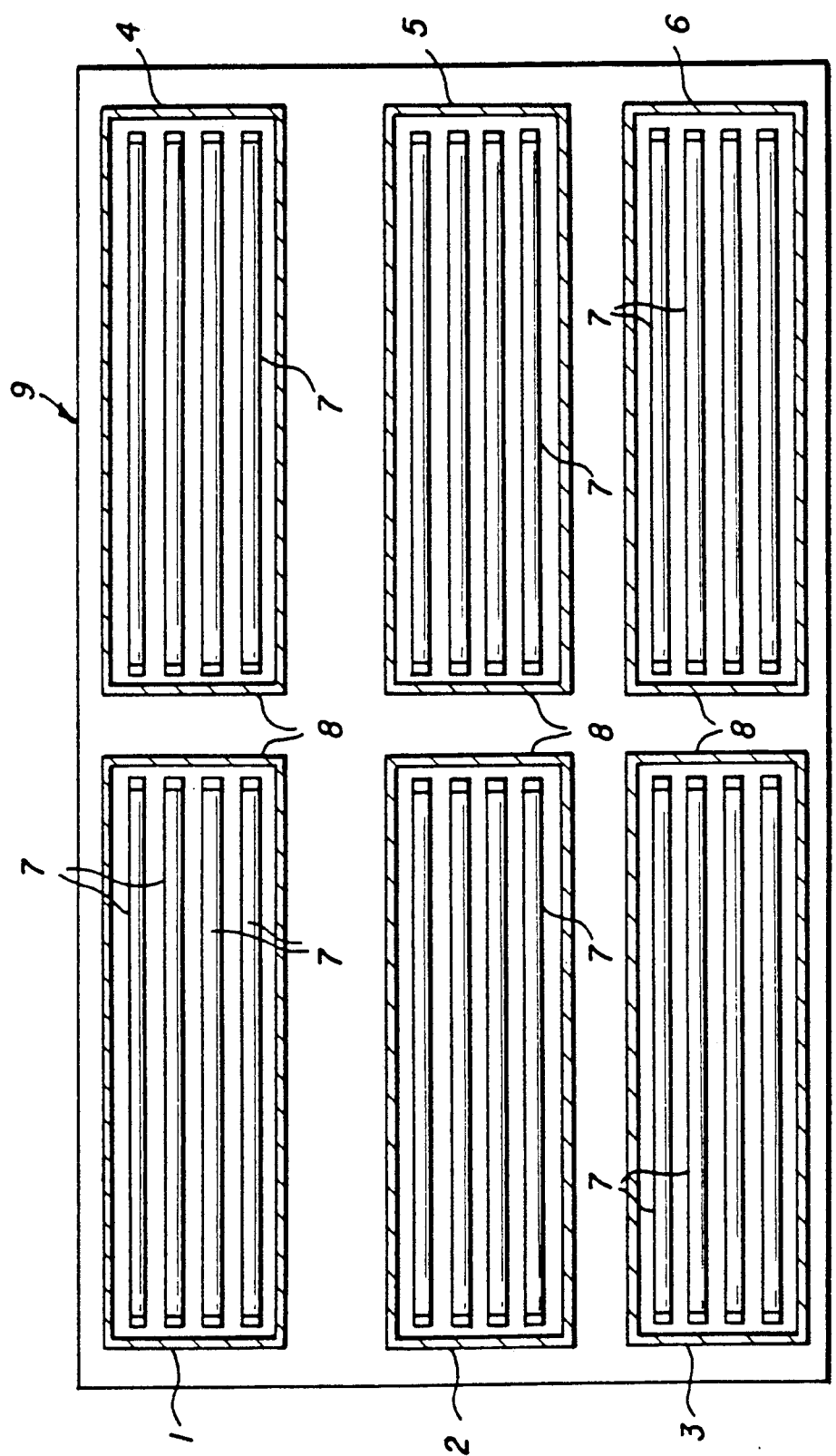
FIG. 4. is a schematic view of multiple radiation sources and reflectors that would be required to provide the necessary area coverage of a typical vineyard trellis.

Blower 16 mounted on the vehicle carriage platform 17 provides a supply of pressurized air 18 into the air duct system 19 to cause a strong air flow to exit at points 20,21,22,23,24, and 25. The air duct system in this embodiment is formed in part by the hollow envelope of the upper structural frame 13 lamp and/or reflector support frames 11 and 12 and by the flexible duct 19. The purpose of the air flow is to cause a movement of the grape leaves so that their undersides become exposed to UV energy from lamps 7 (FIGS. 1 and 4). It is further intended that the air flow would cause the outer leaves on the vine to be displaced from their normal position to permit the inner leaves to be exposed to the UV energy sources as well. An electrical power generator 26 mounted to the vehicle carriage platform 17 provides the electrical power flow required to drive UV lamp sources 7 and blower 16 and for any other electrical needs.

To provide for the difference in the cross slopes of typical terrains a height adjustment means is provided via lift actuators 27. A vertical adjustment of exposure sources provides for the necessary height clearance of trellis posts 33 depending on the uphill or downhill side of the vineyard trellis. Lift actuators 27 are controlled and set from the towing vehicle (tractor) by the operator prior to the start of UV exposure of each vineyard row. Typically the control and lifting forces would be generated and supplied by the tractor hydraulic configuration. Vertical displacement occurs between the upper structural frame 13 and the main apparatus support structure 29. Counterweights 30 are attached to the other end of the upper structural frame 13 (opposite the exposing source end) to counterbalance the off center weight loads.

An adjustment means to reduce the width of the apparatus for transport down highways and narrow roads etc. is provided by sliding the left lamp/reflector support frame 11 into the upper support frame 13 and securing it in position with clamp 51. Similarly the right lamp/reflector support frame 12 is slid over the left lamp/reflector support frame 11 and locked in position with locking clamp 51.

In order to shield and contain the UV rays for purposes of efficiency and the prevention of stray exposure, reflective curtains 31 and 32 are suspended behind the left and right bank of UV exposure sources. The reflective curtains redirect any UV rays coming from the opposite side of the vineyard trellis back into the vines. This return reflection serves to increase leaf exposure dosage and uniformity of coverage as well as contain the UV energy within the desired exposure area. An additional function, for safety reasons, is to minimize the possibility of direct exposure of the operator or nearby onlookers.

Figure 2:
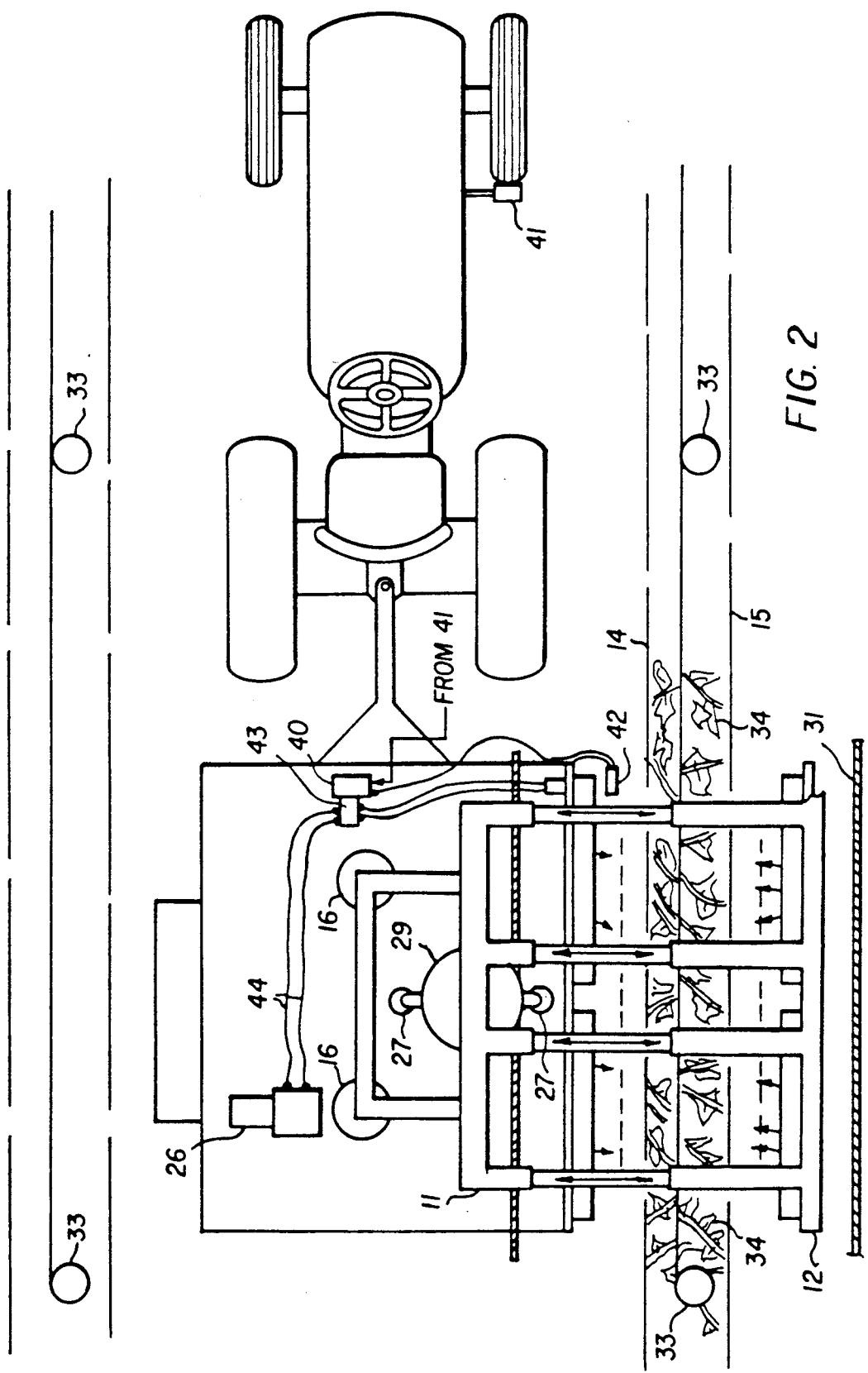
FIG. 2. is a top view of the illustrative preferred embodiment depicted in FIG. 1, shown with a towing vehicle.

In order to provide a measured dosage (as defined later herein) in the application of UV exposure in the field, a method of sensing and controlling the energy intensity factor of the Dosage equation must be provided. Referring now to FIG. 2 a UV intensity/speed transducer 40 takes the voltage output from a speed sensing tachometer 41 along with a voltage output from UV intensity level detector 42 and processes these signals through an A/D (analog to digital) converter (part of UV intensity/speed transducer 40) to vary the UV lamp output through lamp voltage controller 43. The lamp voltage controller modulates the voltage output from generator 26 via electric lines 44 to maintain a predetermined micro-Watt- sec per cm squared level of dosage on the target area.

For practical and vineyard economic reasons it is best to maintain a fairly constant speed. Therefore based on the Dosage required, the operator is given a recommended speed setting. The UV intensity/speed transducer 40 is slaved to the normal variations of tractor speed resulting from changes in slope etc. If for example the speed becomes excessive causing the lamp output to peak, an audio signal sounds to alert the operator to reduce speed and conversely with too slow a speed. In between these high/low speed points the UV intensity/speed transducer varies the UV intensity levels through the lamp voltage controller 43 in accordance with speed variations.

Figure 5:
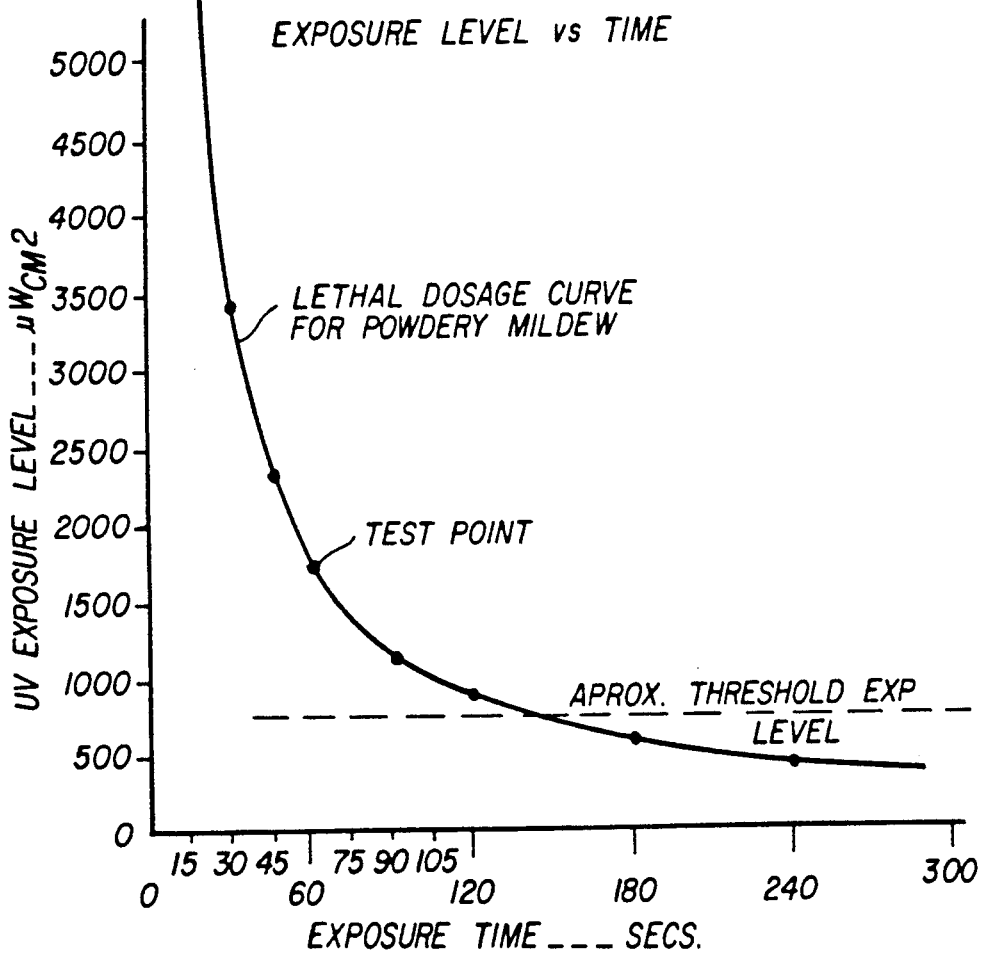
FIG. 5. is a graph depicting the lethal germicidal action of Ultraviolet energy in the germicidal band on apple and grape seedlings infected with Powdery Mildew fungi.
Figure 6:
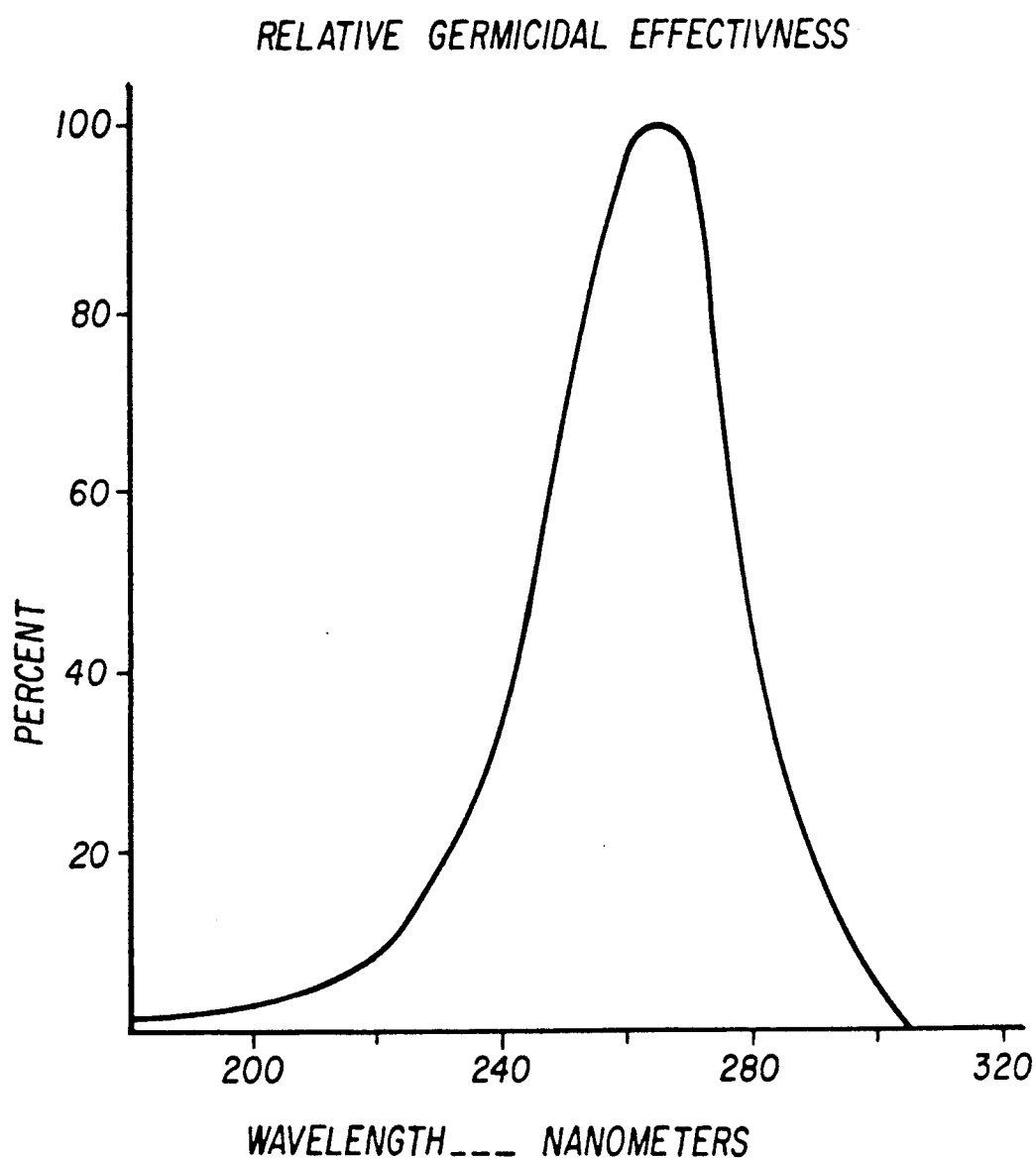
FIG. 6. is a graph showing the relative germicidal effectiveness of Ultraviolet radiationen versus wavelength.
Figure 7:
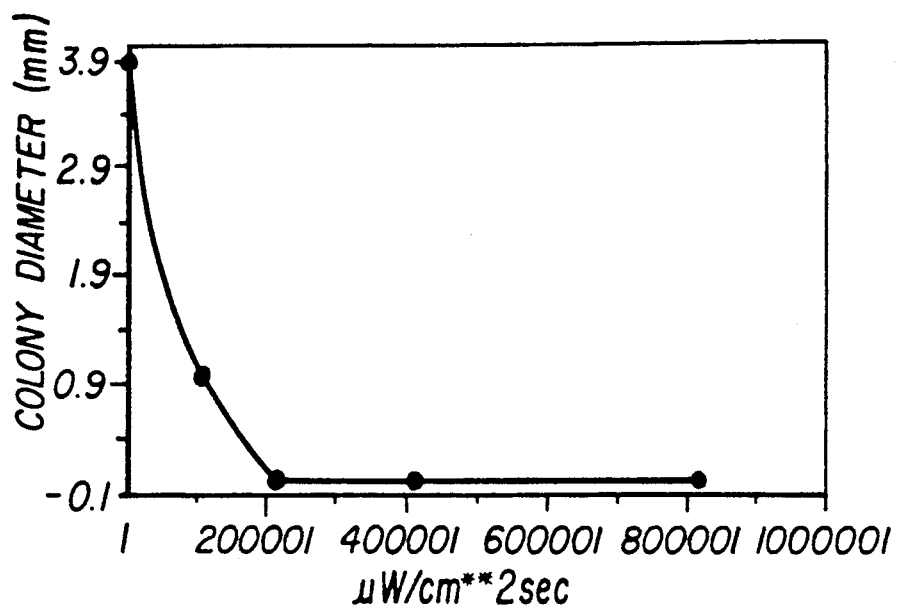
FIG. 7. is a graph showing the effect of Ultraviolet dosage in the germicidal band versus the reduction in the mildew colony diameter on grape seedlings.
Figure 8:
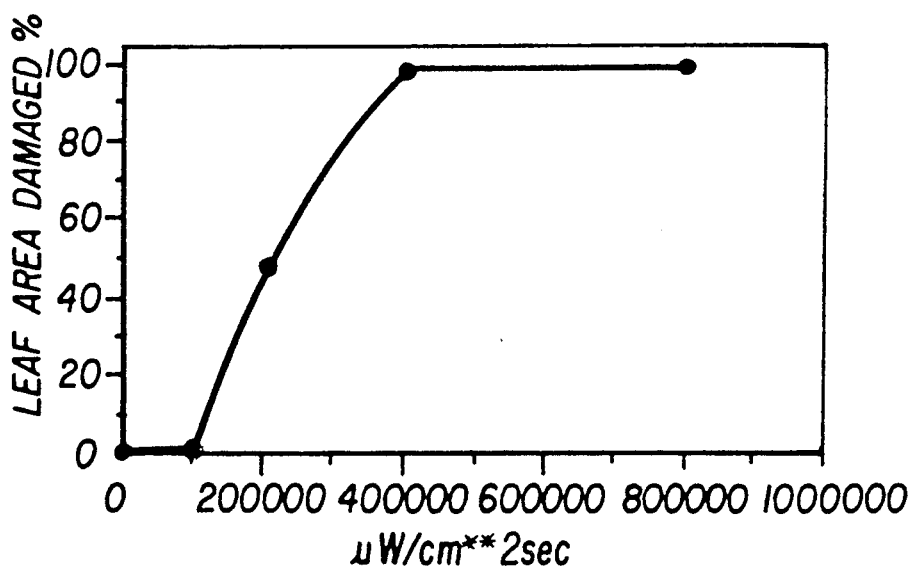
FIG. 8. is a graph showing the effect of Ultraviolet dosage in the germicidal band versus the % of Leaf area damaged.

As shown in FIGS. 5, 7, 8 and Table 1 below, laboratory experiments prove that UV energy in the germicidal band, FIG. 6, is a viable and potential alternative to the use of pesticides in the treatment of plant diseases. As used herein, the term "germicidal band" will be understood to mean the wavelength band from approximately 200-300 nanometers. Tests have shown that a dosage of 1720 micro-watt-seconds per centimeter squared of UV irradiation in the germicidal band is highly lethal to Powdery Mildew colonies growing on both the apple and grape seedlings tested. The data demonstrated the feasibility of treating trellised grape vineyards and trellised apple orchards as well as most field and row crops including grasses and horticultural plants that are subject to fungal diseases.

TABLE 1

Effects of UV irradiation on apple seedlings infected by Powdery Mildew

| Time of Exposure (min) | Dose micro W sec.per cm squared | Effects |
| --- | --- | --- |
| 0 | 0 | None |
| 1 | 103,200 | Collapse of distal half of conidial chain. Approx. 50% of colony destroyed. |
| 15 | 1,548,000 | Complete collapse of mildew colony. Slight discoloration of marginal area of youngest leaves. |
| 60 | 6,192,000 | Chloroplasts of leaf tissue destroyed. Extensive drying and necrosis of most leaves. |

Most importantly, the experiments further show that the dosage required for lethal results on Powdery Mildew is within economic feasibility of field application techniques with properly designed apparatus such as described herein.

Figure 3:
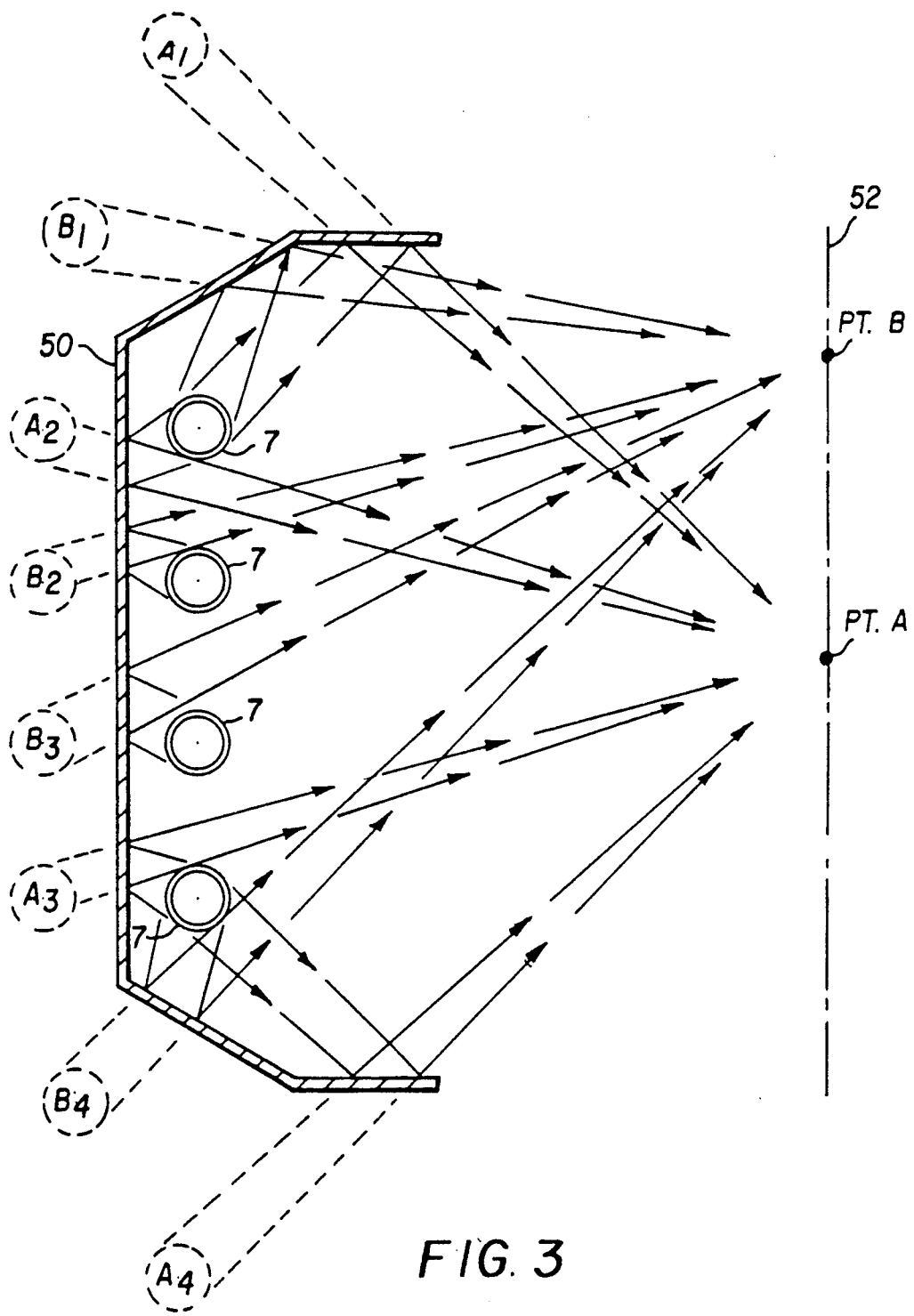
FIG. 3. is a cross section schematic view of multiple Ultraviolet lamp sources with reflectors for redirecting radiant energy in a controlled and efficient manner.

FIGS. 3 and 4 show that adequate and effective energy intensity levels can be developed with proper design of lamp/reflector assemblies. FIG. 3 illustrates how reflector 50 acts to increase the irradiance of the multiple UV lamp sources 7 on the target area 52. UV tubes are readily available with a wavelength of 253.7 nanometers, which is near the peak effectiveness shown in FIG. 5 and such lamps are particularly suitable for use in practicing the present invention. Such lamps are sold for example by Sylvania of GTE Products Corporation and Phillips Lamp Co. As can be seen in FIG. 3, point A on the intended target area not only receives radiation from all lamps directly but also receives radiation from the direction of virtual lamp images A1, A2, A3, A4. Likewise a different point B also receives radiation directly from all lamps but also receives radiation from the direction of virtual lamp images B1, B2, B3, and B4. Similarly, it can be shown that for all points on the target area an increase in radiation over the direct rays from the lamps can be attributed to the effectiveness of reflector 50. Therefore, depending on the efficiency of the reflector design, the irradiation on the target area can be increased over bare lamp designs by approximately 2 to 3 times.

FIG. 4 depicts an array of UV lamp / reflector assemblies 1,2,3,4,5, and 6. Each lamp reflector assembly contains (as shown in this embodiment) four lamps 7 and one reflector 8. Each lamp reflector assembly is located so that the combination of all lamp reflector assemblies provide for a total and uniform coverage within the intended exposing area. Supporting structure 9 is for the purposes of this disclosure a frame or mounting surface that all lamp / reflector assemblies 1 thru 6 are mounted thereon. One lamp array supporting structure 9 in turn is mounted to each of the left and right support frames 11 and 12 of FIG. 1.

The necessity of multiple lamp assemblies is to insure that the area of treatment in this description, the vineyard trellis, is exposed to a level of UV irradiation and that the resultant dosage is lethal to fungi. The lethal Dosage of Ultraviolet is determined by the wavelength of the radiation, the density of the radiant flux incident on the microorganism (watts per unit area) and the time of exposure. DOSAGE=Watt seconds per aquare centimeter of exposure area.

Stated in another way, the plants are exposed to the germicidal band of UV intensity for a duration of time. When the product of the two exceeds a critical value the dosage is lethal and will kill microorganisms.

Using a vineyard as a model system, the required exposure must be applied to cover the grapevines in a vertical as well as in the horizontal directions. The vertical coverage is governed by the physical stature or height of the grapevine. The horizontal coverage is determined by the exposure time required to provide a lethal dose of UV radiation on any point on the vine as the lamp array travels down the vineyard row at a economically viable speed. Exposure time is a function of the horizontal coverage of the UV source arrays, the speed of the towing vehicle and the intensity of radiation impinging on the vines. The preferred embodiment controls the plant irradiation dosage by varying the radiation output of the light source as a function of movement speed, but movement speed could be varied using a constant output light source or both speed and radiation source output could be varied.

The description of the illustrative preferred embodiment above referred to a complete one row exposing apparatus. The capability to expand the apparatus to provide coverage to two rows of plants simultaneously by adding duplicate said light source means and said directing means and said agitating means to the opposite side of said vehicle is readily available.

It should now be apparent from the above description that the present invention provides significant advantages over prior vineyard treatment methods of fungal diseases. The invention has been described in detail with particular reference to preferred embodiments thereof, but it will be understood that variations and modifications can be effected within the spirit and scope of the invention.

I claim:

1. An apparatus for treating a living leafy plant, said apparatus comprising:
    ultraviolet light source means for producing Ultraviolet radiation in the germicidal band;
    light directing means for directing said ultraviolet radiation onto said plant;
    transport means for producing relative motion between said light directing means and said plant; and
    control means for controlling the dosage of said radiation received by said plant as a function of the speed of said relative movement between said light directing means and said plant; and of the intensity of said radiation, to thereby expose said plant to an effective concentration of said ultraviolet exposure.

2. The invention defined by claim 1 in which said ultraviolet radiation is in said germicidal band within the wavelength range of 240 to 280 nanometers.

3. The invention according to claim 1 in which said transport means coprises a land vehicle carrying said light source means for movement past a plant growing in the earth.

4. The invention defined by claim 3 including two of said light source and directing means adapted to expose and irradiate respective opposite sides of said plant as said vehicle moves past said plant.

5. The invention defined by claim 3 including agitating means for agitating the leaves of said plant to increase the leaf area exposed to said radiation.

6. The invention defined by claim 5 in which said agitating means comprises blower means for directing pressurized air against said plant.

7. The method according to claim 5 including the step of agitating the leaves of said plant to increase the leaf area exposed to said radiation.

8. The invention defined by claim 3 including height adjustment means for positioning said light source and directing means according to the height of the plant.

9. The invention of claim 1 in which said control means includes a radiation monitor for detecting radiation onto said plant.

10. The invention defined by claim 1 in which said dosage is controlled by varying the intensity of said radiation.

11. The method of treating leafy plants with ultraviolet radiation, said method comprising the steps of :
    providing a source of ultraviolet radiation within the germicidal band;
    directing said radiation onto said plant;
    effecting relative movement between said plant and said radiation directed thereon; and
    controlling the dosage of said radiation received by said plant as a function of the speed of said relative movement and of the intensity of said radiation to expose said plant to a predetermined concentration of said radiation.

12. The method according to claim 11 in which said radiation is in said germicidal band and is within the wavelength range of 240 to 280 nanometers.

* * * * *